United States Patent
Shi et al.

(10) Patent No.: US 12,450,931 B2
(45) Date of Patent: Oct. 21, 2025

(54) METHOD AND SYSTEM FOR EXTRACTING COMBINATIONS OF DATA FROM A RECEIVED FAX OR MEDICAL DOCUMENT AND MATCHING IT WITH A CORRESPONDING PREAUTHORIZATION RECORD

(71) Applicant: Humana Inc., Louisville, KY (US)

(72) Inventors: Molu Shi, Prospect, KY (US); Greg Hayworth, Louisville, KY (US); Arun Jalanila, Louisville, KY (US); Michael Gayhart, Louisville, KY (US); Cam Whitelaw, Louisville, KY (US); Jason Turner, Louisville, KY (US)

(73) Assignee: Humana Inc., Louisville, KY (US)

( * ) Notice: Subject to any disclaimer, the term of this patent is extended or adjusted under 35 U.S.C. 154(b) by 396 days.

(21) Appl. No.: 18/095,291

(22) Filed: Jan. 10, 2023

(65) Prior Publication Data

US 2024/0233424 A1 Jul. 11, 2024

(51) Int. Cl.
  *G06F 40/295* (2020.01)
  *G06V 30/18* (2022.01)
  *G06V 30/19* (2022.01)

(52) U.S. Cl.
  CPC ...... *G06V 30/19093* (2022.01); *G06F 40/295* (2020.01); *G06V 30/18019* (2022.01)

(58) Field of Classification Search
  CPC ....... G06V 30/19093; G06V 30/18019; G06V 30/10; G06V 30/412; G06F 40/295
  See application file for complete search history.

(56) References Cited

U.S. PATENT DOCUMENTS

| 5,586,262 A * | 12/1996 | Komatsu | G16H 30/20 708/203 |
| 2009/0313194 A1* | 12/2009 | Amar | G06F 16/353 706/20 |
| 2021/0034813 A1* | 2/2021 | Wu | G06N 3/042 |

FOREIGN PATENT DOCUMENTS

JP  2018207270 A  * 12/2018

* cited by examiner

*Primary Examiner* — Huo Long Chen
(74) *Attorney, Agent, or Firm* — Standley Law Group LLP; Jeffrey S. Standley; James L. Kwak

(57) ABSTRACT

A system and method for extracting data from a received fax from a medical provider and matching it with a corresponding preauthorization record using modeling techniques. A received fax is converted into text via OCR, relevant keys are extracted from the text using modeling techniques and differential probabilities are calculated for each key that are then compared to the candidate preauthorization records using logistic regression models to find the most probable matching candidate records. Candidate record matches are ranked by matching probability and the highest ranked candidate record is considered the matching record to the received fax.

15 Claims, 9 Drawing Sheets

Example:
Fax Input -> Search Space Reduction

| Model name | Model description | Extraction model algorithm | Special engineered features | Differentiation model algorithm |
|---|---|---|---|---|
| Authorization id model | Extract authorization id from fax document | Pattern matching | N/A | Logistic regression |
| Patient id model | Extract Patient id from fax document | Pattern matching | N/A | Logistic regression |
| Patient name model | Extract first name and last name of the patient from fax document | Open-source NER and rule-based parsing | 1. Check for medical entity names<br>2. Check if first/last name exists in historical Humana patient name database | Logistic regression |
| Date model | Extract a date from fax document and differentiate the date among date of birth, authorized service start date and authorized service end date | Pattern matching | 1. Age: time between extracted date in fax and when fax is received by Humana<br>2. Whether a list of phrases indicating date of birth is mentioned in the context | Logistic regression |
| Zip code model | Extract zip code of the patient from fax document | Pattern matching | N/A | Logistic regression |

METHOD AND SYSTEM FOR EXTRACTING COMBINATIONS OF DATA FROM A RECEIVED FAX OR MEDICAL DOCUMENT AND MATCHING IT WITH A CORRESPONDING PREAUTHORIZATION RECORD

BACKGROUND OF THE INVENTIVE FIELD

The present invention is directed to a system and method for extracting data from a received fax from a medical provider and matching it with a corresponding preauthorization record using modeling techniques. Candidate record matches are ranked by matching probability and the highest ranked candidate record is considered the matching record to the received fax.

Healthcare insurance companies often require preauthorizations for certain services before patients receive them. During a preauthorization process, a healthcare provider first calls the insurance company via telephone to create a unique record in a preauthorization database of the insurance company containing patient information and information regarding the service needed (e.g., such as inpatient versus outpatient) to start the preauthorization process. The healthcare provider then sends clinical information regarding the patient to the insurance company via fax to justify the medical necessity for the preauthorization. The preauthorization database can also be referenced in short as the "authorization database".

To evaluate the preauthorization request, the unique record in the preauthorization database must be matched with the corresponding fax sent by the provider. For a large insurance company having many customers, this review process may require the matching of 10,000 faxes per day to its corresponding unique preauthorization record. Traditional approaches for this fax matching process requires human readers to manually identify required member and service information, and to manually search the preauthorization database to match each fax to the unique record in the preauthorization database. This traditional method is time consuming, expensive, and is prone to error. The present invention offers a machine learning based approach to automatically predict the matching of incoming faxes to its corresponding unique preauthorization record. The present invention and associated prediction models can improve user productivity and accuracy when compared to the traditional approach.

SUMMARY OF THE GENERAL INVENTIVE CONCEPT

In one embodiment of the invention, the present invention is comprised of a method for extracting data from a received fax from a medical provider and matching it with a corresponding preauthorization record, the method comprising the steps of: storing a plurality of preauthorization records in a database; extracting a plurality of keys from the received fax using a plurality of key extraction models, where the plurality of keys optionally include at least two of the following an authorization ID, patient ID, patient name, patient zip code or patient date of birth; assigning a differential probability to each of the extracted keys; applying a deep learning model to the plurality of extracted keys and assigned differential probability of each of the extracted keys to match the received fax to a corresponding preauthorization record by:

a. determining a list of potentially matching candidate preauthorization records by matching one or more of the extracted keys to matching data from the plurality of preauthorization records;
b. determining normalized distances between the plurality of extracted keys and their corresponding matching data fields from the plurality of preauthorization records;
c. using the normalized distances together with corresponding differential probabilities of the plurality of extracted keys as feature inputs to the deep learning model to match the received fax to the corresponding preauthorization record;
d. determining a top match candidate with the highest matching probability; and
e. outputting the top match candidate to a user interface.

The foregoing and other features and advantages of the present invention will be apparent from the following more detailed description of the particular embodiments, as illustrated in the accompanying drawings.

BRIEF DESCRIPTION OF THE DRAWINGS

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

In addition to the features mentioned above, other aspects of the present invention will be readily apparent from the following descriptions of the drawings and exemplary embodiments, wherein like reference numerals across the several views refer to identical or equivalent features, and wherein:

FIG. 4 is a diagram illustrating an example application of the search and space reduction method of the present invention;

FIG. 7 is a table illustrating a list of example key extraction models and differentiation model properties of the present invention;

DETAILED DESCRIPTION OF EXEMPLARY EMBODIMENT(S)

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

Figure 1:
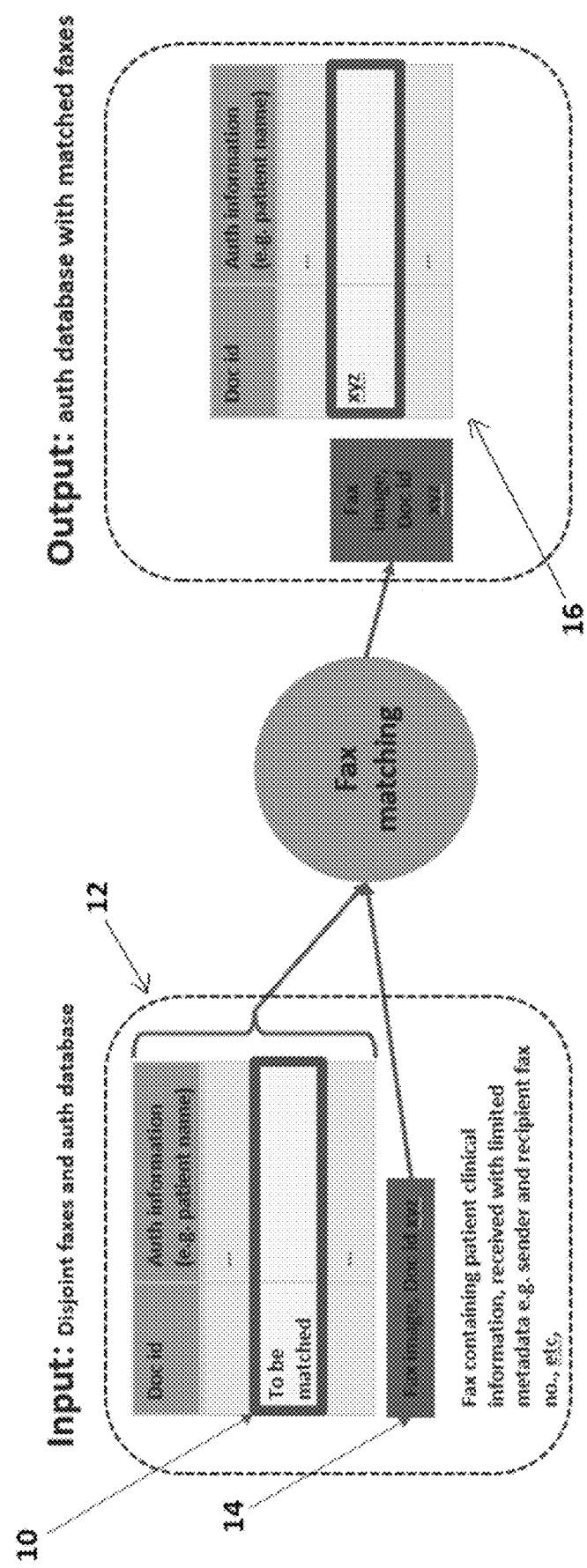
FIG. 1 is a diagram illustrating one embodiment of the method of the present invention depicting example inputs and outputs of the invention.

FIG. 1 is a diagram illustrating one embodiment of the method of the present invention depicting example inputs and outputs of the invention. As illustrated, the present invention matches each unique preauthorization record 10 stored in the preauthorization database 12 with a corresponding fax 14 sent by a healthcare provider having patient clinical information and various metadata (e.g., sender and recipient fax numbers). The fax or fax image is preferably associated with a document identification ("Document ID"—in this example XYZ) that is later used to link the fax with each corresponding record in the preauthorization database. As previously discussed, a unique record (or preauthorization record) is created by the insurance company agent or clinician based on event and patient information communicated by a provider via telephone. The present invention uses the unique methods discussed below to match each unique preauthorization record with its corresponding received fax or fax image. In the example embodiment described, once matched, the system generates an output 16 comprised of the matched preauthorization record populated with the corresponding Document ID from the matched fax.

Figure 2:
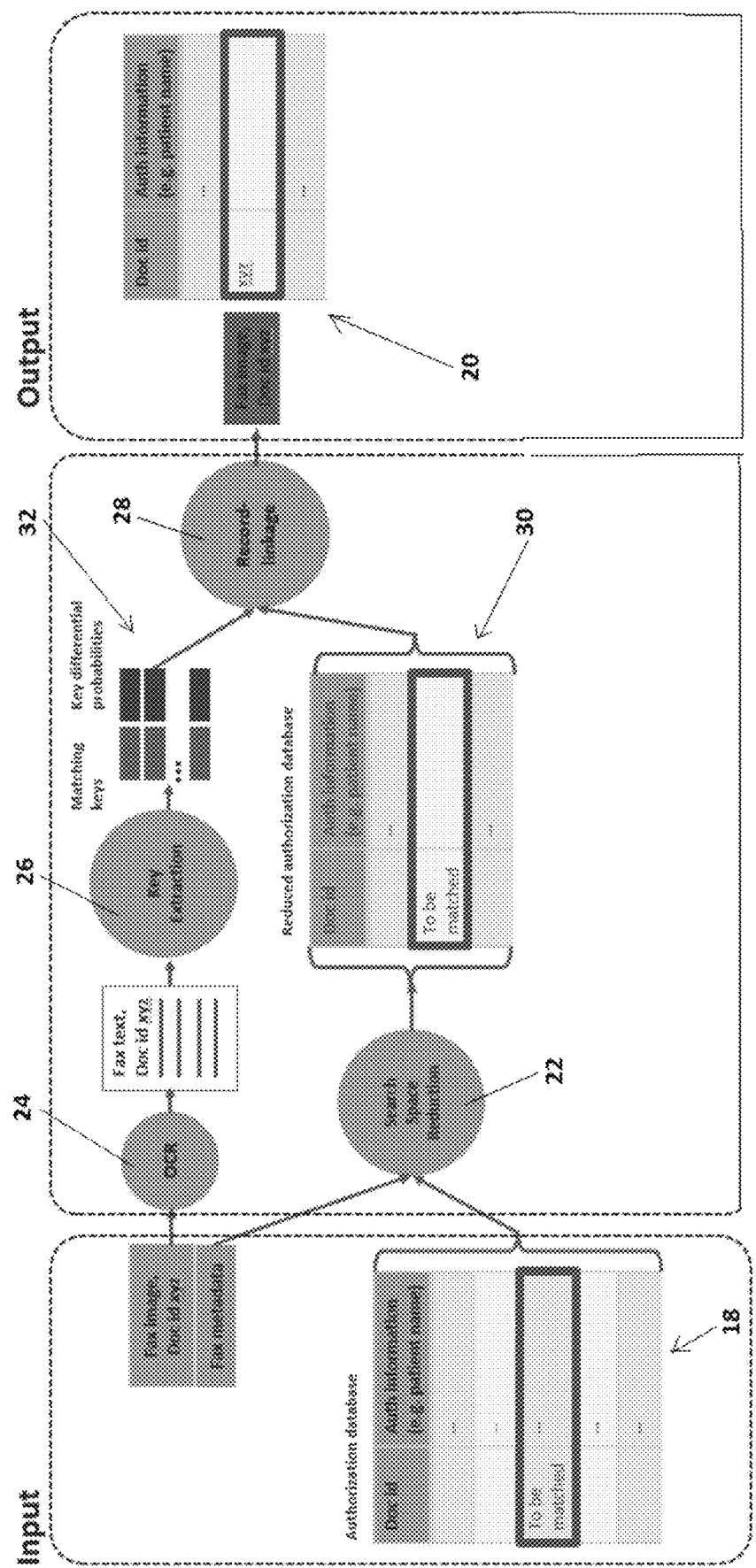
FIG. 2 is a diagram illustrating one embodiment of the fax matching method of the present invention.

In one example embodiment, the preauthorization record is comprised of the following information:

Authorization ID (system generated unique ID for preauthorization)
  Patient or member ID
  Patient name
  Patient zip code
  Patient date of birth
  Date of service
  Facility Provider tax ID (used to identify the facility associated with the preauthorization)
  Authorization type
  Authorization request type
  Member consolidated market
  Program management FIG. 2 is a diagram illustrating one embodiment of the fax matching method of the present invention. The fax matching process takes a fax image (with metadata) and records, and stored data, of a preauthorization database 18 as input. The output is a matched pair 20 of the fax image with the corresponding record in the preauthorization database.

In the example embodiment described, the fax matching process consists of four subprocesses: search and space reduction 22, OCR (optical character recognition) 24 of the fax image, key extraction 26, and record linkage or matching 28. The OCR process converts the fax images into text data. This process may be accomplished by directly leveraging a known open-source software package.

Figure 3:
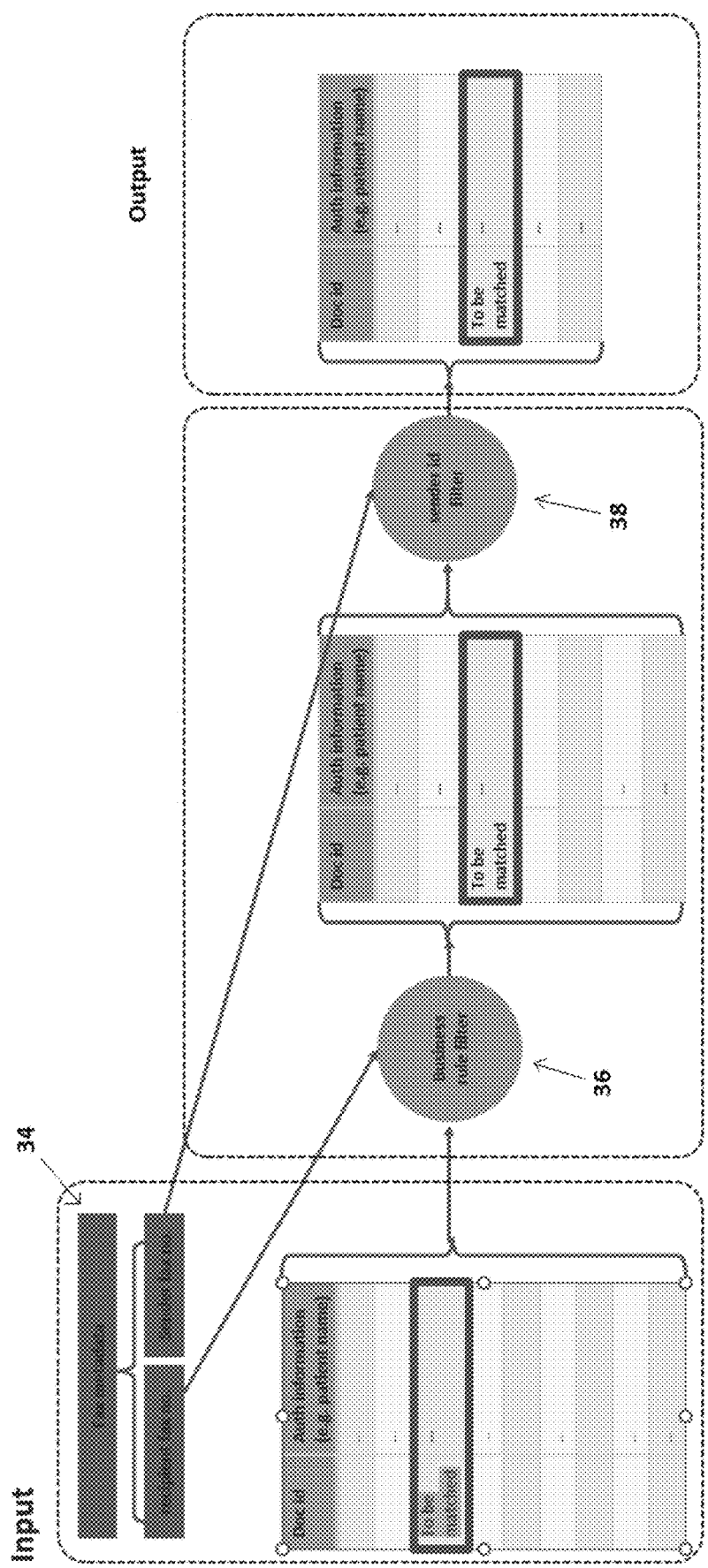
FIG. 3 is a diagram illustrating one embodiment of the search and space reduction method of the present invention.

The search and space reduction process of the present invention, as depicted in FIG. 3, preferably uses heuristic rules that leverages the incoming fax metadata to select (or "filter out") a subset of records in the preauthorization database. Such reduction of space (or the number of potentially relevant candidate records) can improve the matching accuracy for the final record linkage process and reduce processing times. For example, the search and space reduction process makes use of the fax metadata, such as incoming fax number or recipient fax number, to reduce the number of potentially relevant candidate records of the preauthorization database into a smaller subset. For example, an incoming or sender's fax number can be used to select only the records from the preauthorization database associated with a specific healthcare facility associated with the incoming fax number (in other words, because the system is intelligent to know that the incoming fax number is associated with Hospital A, for example, the system then selects all of the records in the preauthorization database associated with Hospital A (for matching and linking purposes) and filters out the rest of the other records which do not correspond to Hospital A. This reduces the number of possible candidate matching pool of preauthorization records and thus the space and processing needed to match and link the records with their corresponding faxes. The reduced pool of preauthorization records is referred to as the "reduced preauthorization database" 30 or the subset of candidate records from the preauthorization database.

Figure 5:
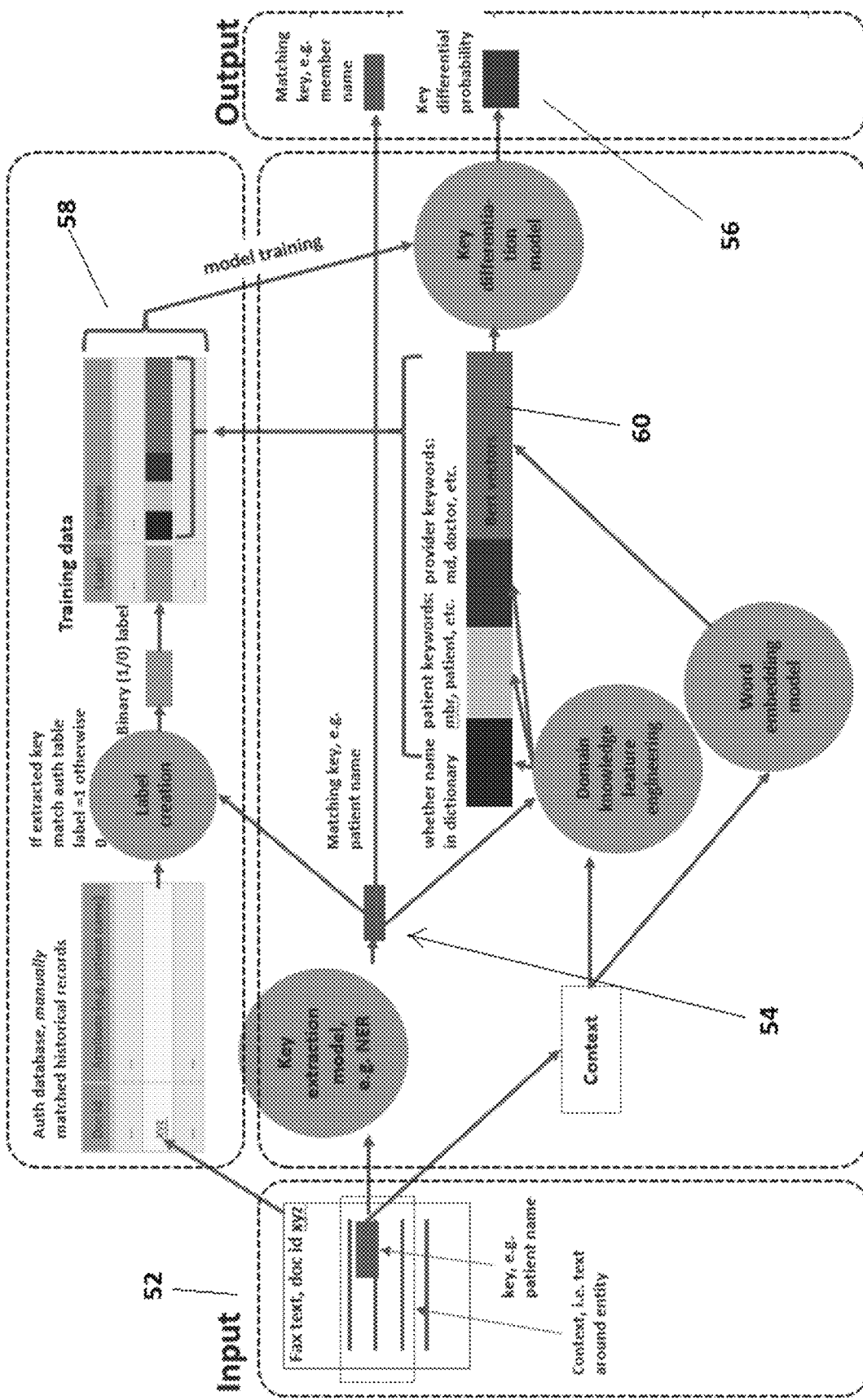
FIG. 5 is a diagram illustrating one embodiment of the key extraction, key matching and model training method of the present invention.

The key extraction process as depicted in detail in FIG. 5, takes the converted text data from OCR of the fax image and outputs a set of potentially matching keys for matching/linkage with the preauthorization database, such as authorization ID, member ID, member name, etc., along with their corresponding differential probabilities 32. A unique authorization ID is preferably created and stored into each of the preauthorization records. In the perfect world, each received fax would have a unique authorization ID so that each fax could easily be matched with a corresponding preauthorization record having the same or matching authorization ID. However, not all faxes come populated with an authorization ID. Thus, because not all faxes have a unique authorization ID, the present invention is configured to extract other possible keys from the fax image to be used to match each fax with a corresponding preauthorization record. By extracting out multiple possible keys from the fax image, the present invention is more flexible and accurate.

Figure 8:
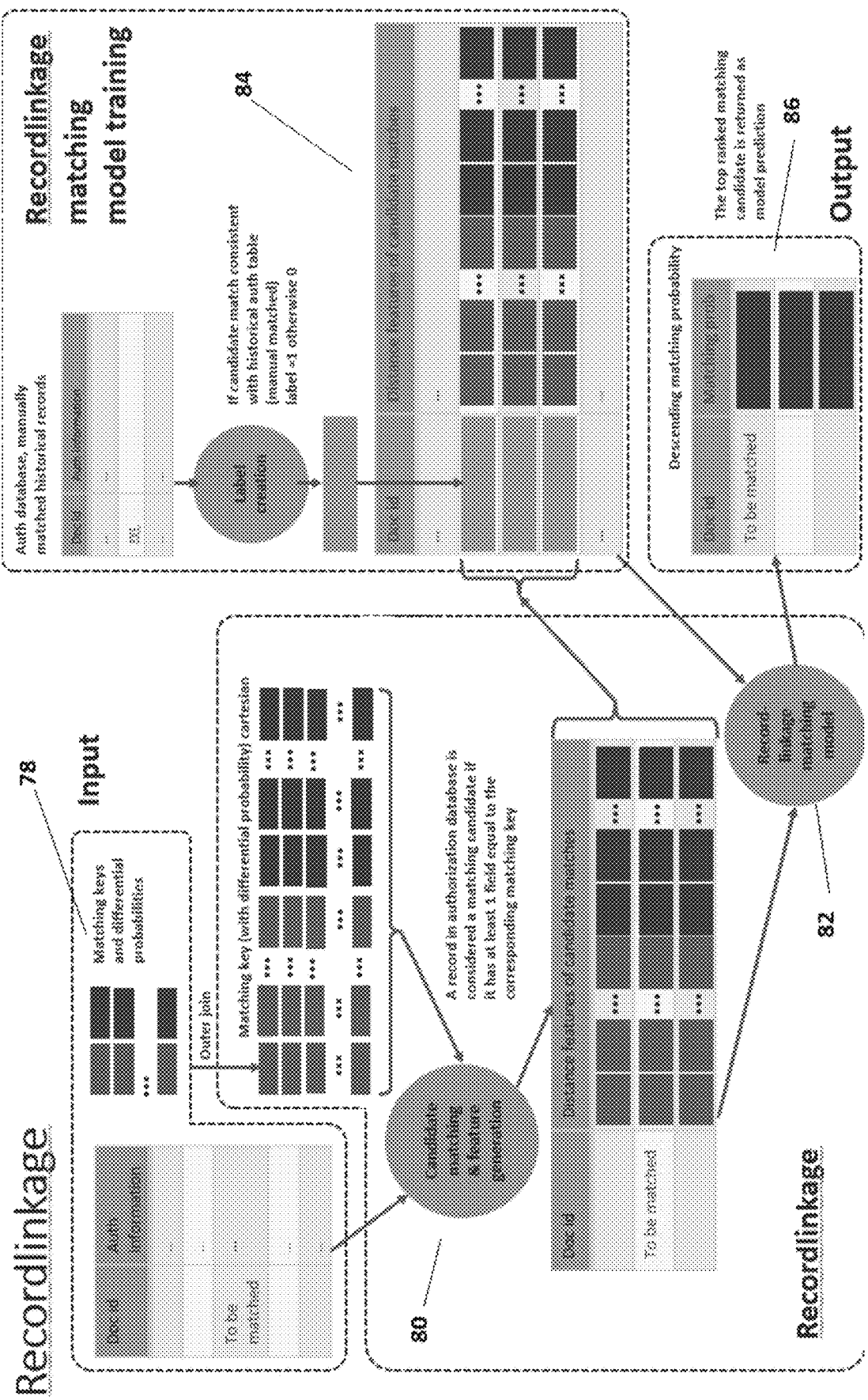
FIG. 8 is a diagram illustrating one embodiment of the record linkage or matching method of the present invention.

As illustrated in FIG. 8, the record linkage or matching process of the present invention takes the set of extracted keys and probabilities, and the reduced preauthorization database as input, and uses a machine learning approach to match each fax to a record in the preauthorization database with the highest probability of being a match.

FIG. 3 is a diagram illustrating one embodiment of the search and space reduction method of the present invention in detail. Again, the process preferably uses heuristic rules that leverages the incoming fax metadata to select (or "filter out") a subset of records in the preauthorization database to reduce the database size or the number of relevant records for matching and linking purposes. In one example embodiment, two categories of metadata are used for the search and space reduction process: recipient fax number and sender fax number (shown generally at 34). In the preferred embodiment of the invention, the healthcare insurance company conducting the preauthorization uses multiple recipient fax numbers for preauthorization requests—each one used for a designated preauthorization process, defined, for example, by patient plan selling states or other defined market, authorization type (inpatient vs. outpatient), request type (preauthorization, concurrent, expedited, etc.), admission type (acute vs. post-acute), and lines of business. All such information is preferably captured in the preauthorization database, which can then be used to select a subset of records once the recipient fax number is known. Thus, the process of the present invention filters out the irrelevant (nonmatching) records based on recipient fax number and sender fax number (shown generally at 36 and 38 respectively) to reduce the number of possible matching preauthorization records.

Incoming fax numbers (or sender fax numbers) used by healthcare facilities can be stored and tracked for use in later transactions. For an incoming fax, the received sender fax number may be used to filter out preauthorization records that are sent by other healthcare facilities that are not associated with the sender fax number.

Figure 4:
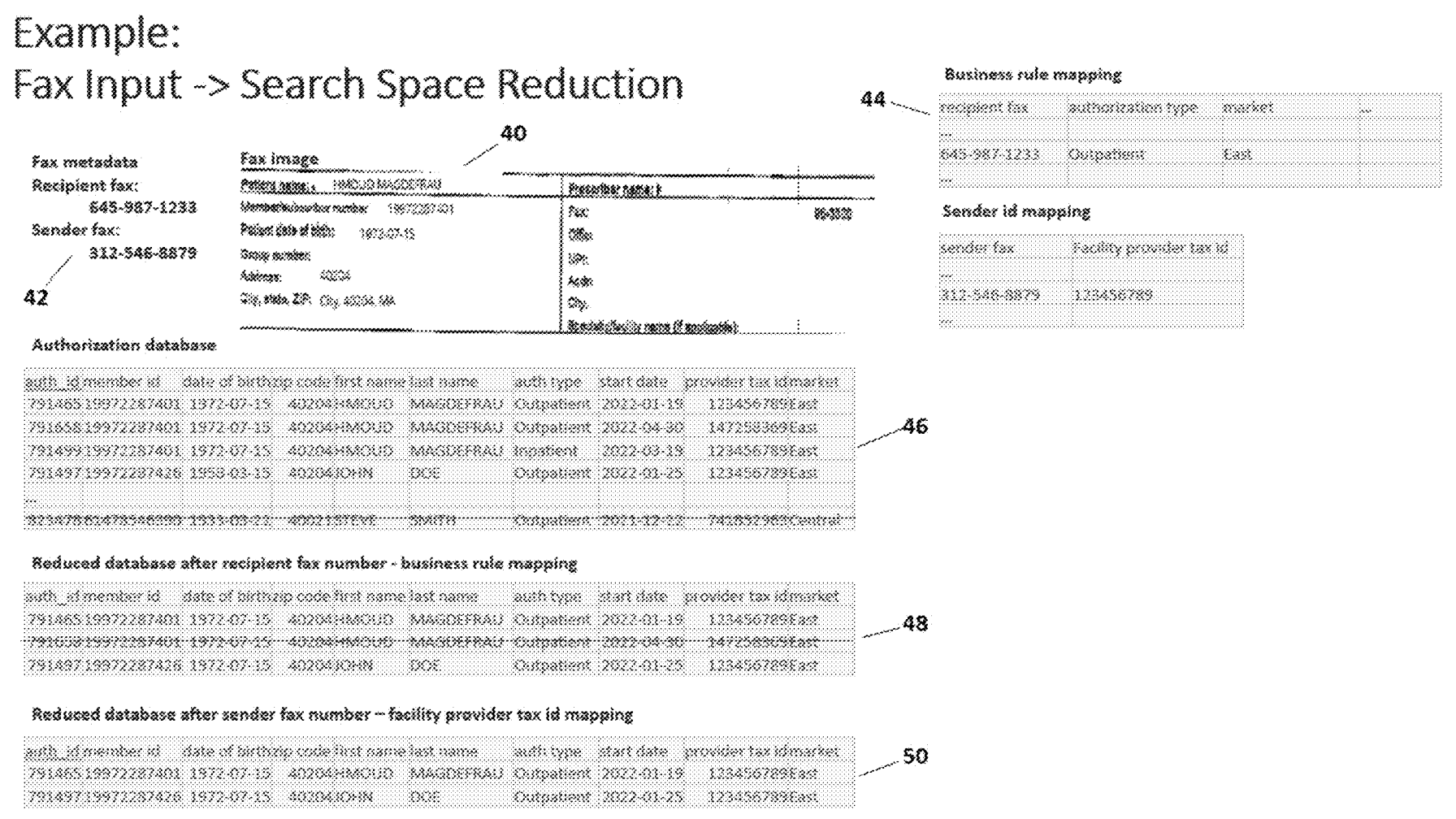

FIG. 4 illustrates an example application of the search and space reduction method of the present invention. A fax 40 is received from a provider having fax metadata (shown generally at 42). Using set business rule mapping, the metadata (e.g., recipient and sender fax numbers) can be used to map the fax to a particular sending health care facility (e.g., by facility provider tax ID) and to other relevant information about the fax (e.g., outpatient vs. inpatient, etc.). For example, in this example, the received recipient fax number is used to map the fax as an outpatient type of procedure located in the East market (shown generally at 44). Thus, the system is configured to exclude the other records in the preauthorization database that are inpatient or not related to the East market. Similarly in this example, the sender fax number is used to map the fax to a sending facility provider using the facility provider tax ID. This mapping of information can then be used to exclude records from the preauthorization database that do not have the same matching information. For example, all records in the preauthorization database where the location is not in the East market is excluded (shown generally at 46) and all records that do not have a matching facility provider tax ID are also excluded (shown generally at 48). After excluding or filtering out the nonmatching or nonrelevant records, a subset of potential candidate records or reduced preauthorization database is then used for the matching and linking processes of the present invention. This reduced database after excluding nonrelevant preauthorization records is shown generally at 50.

Recipient Fax Number and Business Rule Mapping Details (in other words, this is the type of information that may be derived from the recipient fax number and stored and used to exclude nonrelevant records):

1. Recipient fax number: a designated fax number to which a provider faxes clinical information to the insurance company for specific business needs.
2. Authorization type: type of authorization, including inpatient, outpatient, behavioral health inpatient and behavioral health outpatient.
3. Authorization request type: type of request sent for authorization, such as preauthorization, concurrent, expedited, etc.
4. Member consolidated market: geographical market where patient's insurance plan is administered by the insurance company, such as Texas, South Florida, East, West, etc.
5. Admission type: for inpatient and behavioral authorization types—type of admission such as acute, post-acute, electroconvulsive therapy, etc.
6. Program management: program a patient is administered by, such as Medicare, Medicaid, etc.
7. Authorization age: time in days between an authorization is created in database until the fax is received by the insurance company.

Logic used: if a recipient fax number is unavailable from the fax metadata of the received fax or a recipient number does not exist in the business rule mapping table, it is preferable to use all records in the preauthorization database to search for a matching candidate for the incoming fax. Otherwise, in one embodiment, all records from the preauthorization database are selected only if all non-empty data fields from the preauthorization record are included in the list of accepted values of the same data fields defined by the recipient number in the mapping table. If a data field in the mapping table is empty, then any value in the same data field from the preauthorization database is acceptable.

Sender Fax Number and ID Mapping Details (in other words, this is the type of information that may be derived from the sender fax number and stored and used to exclude nonrelevant records):

1. Sender fax number: fax number from which a provider uses to send clinical information to the insurance company for preauthorization.
2. Facility provider tax identification number: tax identification number of the healthcare provider where the service requiring preauthorization is to be performed.

Logic used: if a sender fax number is unavailable from fax metadata or the sender fax number does not exist in the sender ID mapping table, all records in the preauthorization database are used to search for a matching candidate for the received fax. Otherwise, records from the preauthorization database are selected only if the facility provider tax ID is empty or equals the facility provider tax ID defined by the sender fax number in the mapping table.

FIG. 5 is a diagram illustrating one embodiment of the key extraction and key differentiation model training methods of the present invention. The text data output from the OCR process is used at the input to the key extraction process (shown generally at 52). In one example embodiment of the invention, a set of five key extraction models are used to identify possible keys from the text, including name, date, member ID, authorization ID, and zip code (shown generally at 54). The extracted keys are then used to match each received fax with a corresponding preauthorization record. In other words, if the same authorization ID is found in a received fax and a preauthorization record, the system is trained to recognize that these are matching and need to be linked together.

The name model preferably leverages two consecutive opensource solutions, Spacy NER (named entity recognition) and ProbablePeople. The former identifies the full name, and the latter parses first name versus the last name. All of the other key extraction models preferably use pattern matching models.

In this example embodiment, the five key extraction models output six matching keys, with first and last name parsed from the name model treated independently. In addition to outputting the six matching keys, six corresponding differential probabilities are computed as confidence levels for each of the keys, respectively (outputs of key extraction and key differential probabilities shown generally at 56). These computations are performed by applying six machine learning based models that are trained from historical data (key differentiation model training shown generally at 58). Features used for the models include both generic word embedding (e.g., Bidirectional Encoder Representations from Transformers or "BERT") and engineered features such as keyword matching. BERT may be used by the present invention to extract features, namely word or sentence embedding vectors that are then out for use in the subsequent matching and linking processes (shown generally at 60). The differential probabilities are used in the next stage of the record linkage process as feature variables, which are factored in the model training process. As one example, if the record linkage process receives two sets of names (e.g., name of patient, name of physician) from the name key extraction modeling process from the same received fax, and both have possible candidate matches with records in the authorization database, the models weigh the differential probabilities as confidence ratings of the extracted name keys belonging to a patient versus a physician when making the final prediction on the best match between the fax and preauthorization record.

Figure 6:
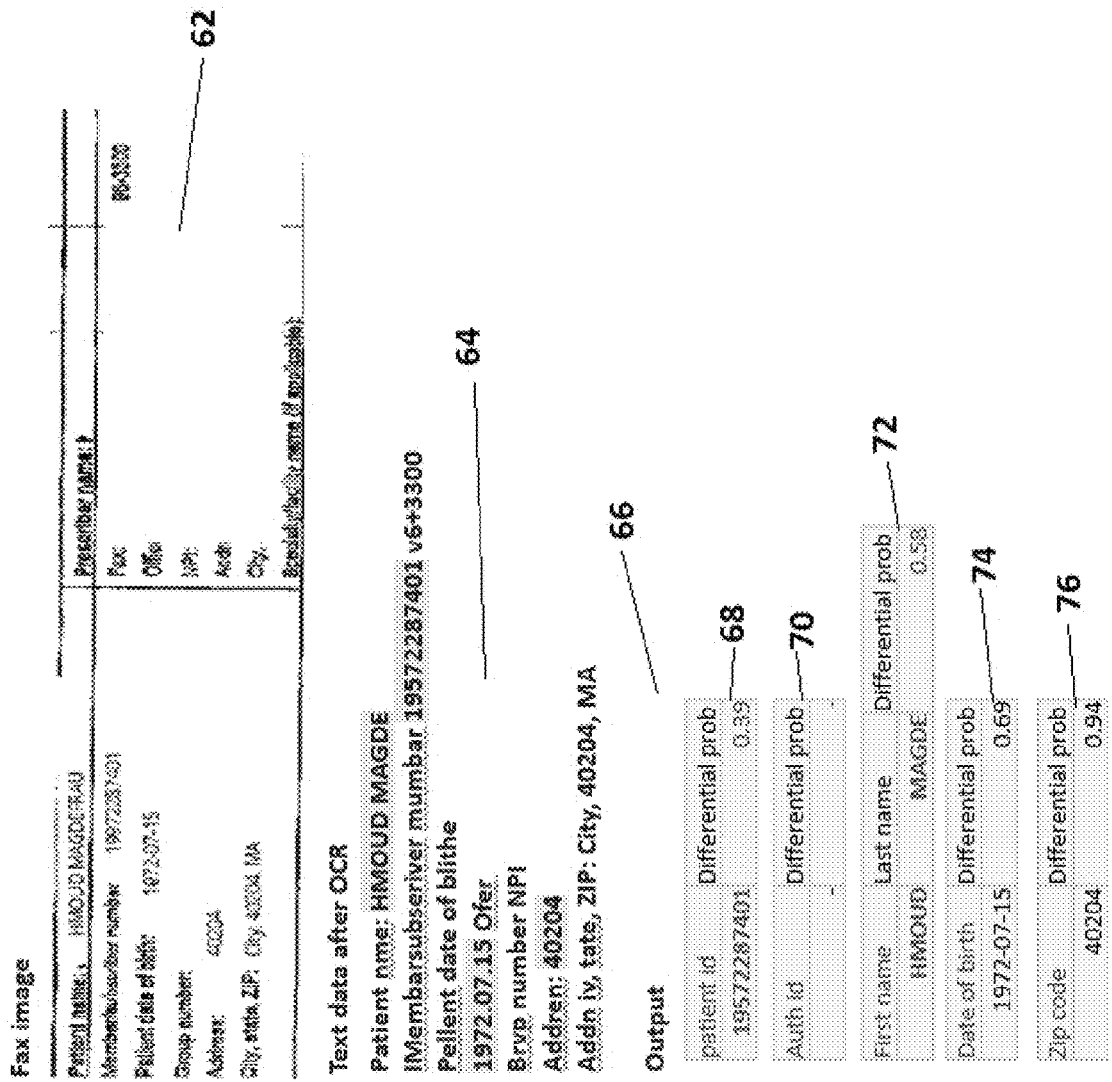
FIG. 6 is a diagram illustrating an example application of the OCR and key extraction method of the present invention.

FIG. 6 illustrates an example application of the OCR and key extraction method of the present invention. As illustrated, a fax image 62 is received from the provider which is converted to text data using OCR (shown generally at 64). The output of the key extraction process of this example is shown generally at 66. As illustrated, in this example embodiment, the system is configured to output up to six keys and their corresponding differential probabilities (e.g., patient ID, authorization ID, first name, last name, date of birth (DOB), and zip code). In this example, an authorization ID was not found in the received fax and therefore no authorization ID key was extracted.

The patient ID key extracted by the patient or member ID extraction model is shown generally at 68. In this example, the full line of converted text "IMembarsubseriver mumbar 19572287401 v6+3300" is transformed to a BERT vector by using the Sentence Transformer Distilbert word embedding model. As illustrated, the OCR process may not convert the fax image correctly if the image resolution is bad or compromised. This information may be used as a model feature input for the patient ID key differentiation modeling, resulting in the differential probability of 0.39.

The authorization ID key extracted by the authorization ID extraction model is shown generally at 70. In this example, there was no authorization ID match returned for the authorization ID extraction model, thus, there is no corresponding differential probability.

The first and last name key extracted by the name extraction modeling is shown generally at 72. In this example, a Spacy named entity Recognition model may be used to extract HMOUD MAGDE as the patient nme. A Probable-people model is used to parse HMOUD and MAGDE as first and last name, respectively. For this example, the name differentiation model uses two sets of feature inputs: BERT vector transformed from full line text "Patient name: HMOUD MAGDE" and a binary feature input whether the words exist in historical database. In this example, the words HMOUD and MAGDE were both encoded for 0 (name not in dictionary), and the resulting differential probability is obtained at 0.58.

The DOB key extracted by the DOB extraction model is shown generally at 74. In this example, 1972.07.15 is extracted by applying the date extraction model. In addition to the BERT vector feature, the time span in years between 1972.07.15 and the current date is computed as a feature input to differentiate patient birthdate to other common dates found in clinical records such as date of service.

The zip code key extracted by the zip code extraction model is shown generally at 76. In this example, the numbers 40204 are extracted by zip code extraction model, and the differential probability of 0.94 computed by the zip code differentiation model with the BERT vector feature.

FIG. 7 is a table illustrating a list of example key extraction models and differentiation model properties of the present invention. In the example embodiment of the invention, in addition to special engineered features, all differentiation models use BERT vector features generated from two lines of context text: 1) line within which the key is identified by the extraction model, and 2) the line proceeding 1). For example, the line for dob: "1972.07.15 Ofer" gets a BERT vector from this line itself, and another BERT vector for the line above it "pellent date of blithe", corresponding to the 1) and 2), respectively. The specially engineered feature is the "the time span in years between 1972.07.15 and the current date". All three are considered as feature inputs to the differentiation model.

In this example, all of the key extraction models are preferably run in the order as listed on the slide. However, if an authorization ID is extracted from the fax and matched to a record in the record linkage step, the record linkage matching model inference step is skipped and the process is configured to predict this pair as matched. In other words, if a matching authorization ID is matched between a received fax and unique preauthorization record, then the system will predict that there is a sufficient match without running the models on the other extracted keys. This is preferably a configurable setting in the product, because an authorization ID extracted from the received fax and matched to a record may be a wrong prediction. This is typically caused by an OCR error, i.e., authorization ID conversion step from image to text with certain characters corrupted. With the image quality and OCR error rate today, there is an overall lower error of claiming record matching from authorization ID alone than having the record linkage model infer the best matching using all the extracted keys. However, having a configurable setting can allow the processes to handle future cases using all of the extracted keys when fax image quality becomes worse.

FIG. 8 is a diagram illustrating one embodiment of the record linkage or matching method of the present invention using the extracted keys and corresponding differential probabilities (shown generally at 78). The candidate matching and feature presentation step is shown generally at 80. The record linking matching model is applied (shown generally at 82). As illustrated, the record linkage matching model applied considers all the feature variables as input, and after model training (shown generally at 84), outputs matching probability showing the confidence whether a candidate pair of fax and authorization record is matched. The probabilities, and candidate preauthorization records, are ranked and the system is configured to pick the candidate pair (e.g., fax and matched candidate preauthorization record) with the highest matching probability as the most likely match (this output shown generally at 86). In one example embodiment, a record in the preauthorization database is considered a matching candidate to a received fax if it has at least one data field equal to the corresponding key. In one embodiment, the matched pair may be linked by storing the document ID of the received fax into the matched preauthorization record.

Figure 9:
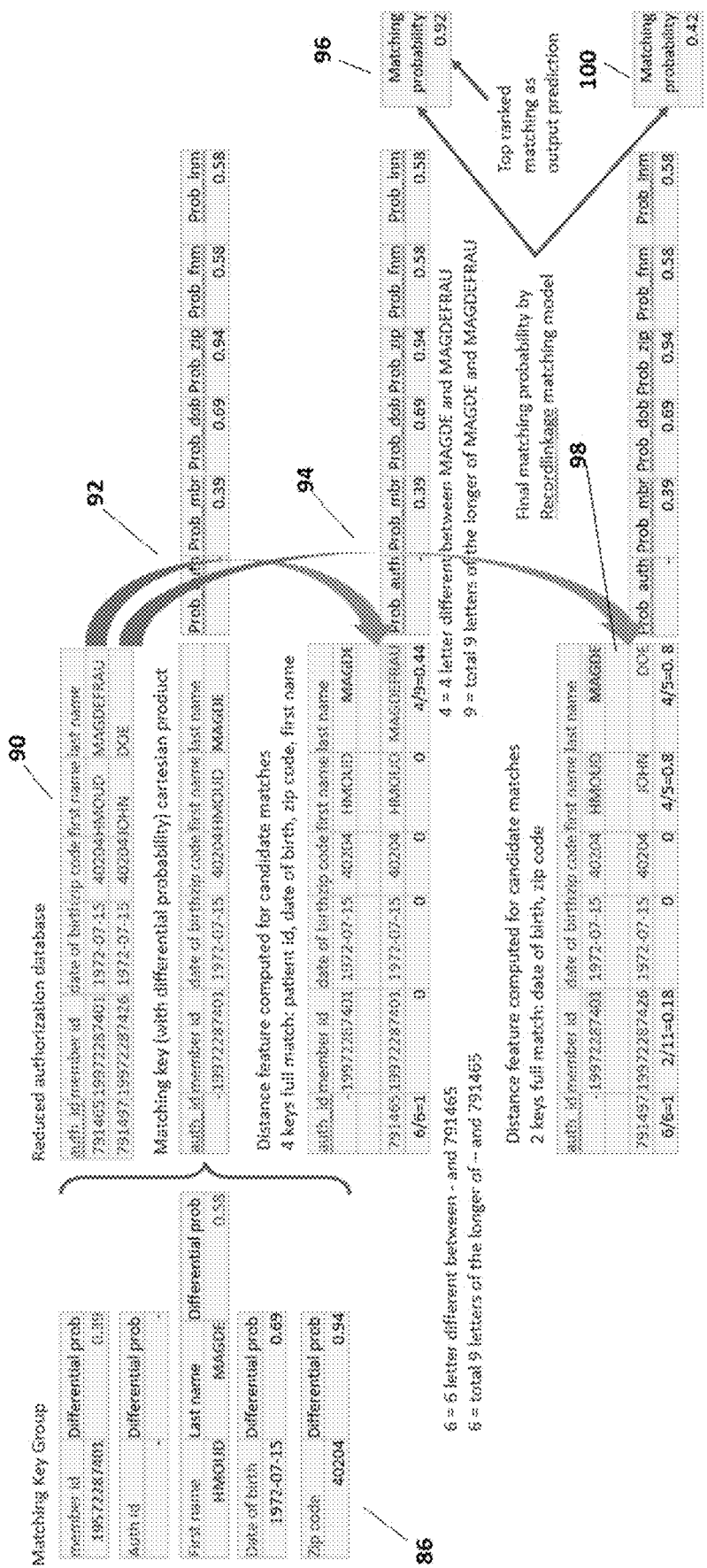
FIG. 9 is a diagram illustrating an example application of the record linkage or matching method of the present invention.

FIG. 9 is a diagram illustrating an example application of the record linkage or matching method of the present invention as shown in FIG. 8. As illustrated, the system extracts keys from the received fax and their corresponding differential probabilities (shown generally at 88). As discussed, using the sender and receiver fax numbers, the search and space reduction processes are applied to reduce the number of relevant fields of the preauthorization database (step shown generally at 90).

As discussed, the matching key cartesan product (with differential probability) is generated as previously discussed (shown generally at 92) which is used to compute the possible candidate matches using the modeling processes previously discussed. The example of FIG. 9 shows the possible matching of two different preauthorization records (shown respectively at 94 and 98). As illustrated, the first match results in full or complete matches of four keys (patient ID, DOB, zip code, first name). Distance features are computed for each of the keys when compared to the corresponding field of the candidate preauthorization record. In particular, in this example, the system is configured to use the edit distance, normalized to the longer length of the 2 words, resulting in an input feature range between 0 and 1. In this example, the last name extracted from the fax and the last name found in the first candidate record are different (MAGDE versus MAGDEFRAU) which is not a full match. The edit distance for the last name is thus computed as 4, resulting in a normalized distance feature of 4/9, where 9 is the number of characters in MAGDEFRAU. The distance features for all other full match keys result in 0. These distance features, together with the differential probabilities carried over from the differentiation models, i.e. 0.39, 0.69, 0.94, 0.58, and 0.58 for member id, dob, zip code, first and last name differentiation models, respectively, are used as feature input for the record linkage model, resulting in a final matching probability of 0.92 (shown generally at 96).

The second candidate record has only 2 complete matches with the extracted keys of the received fax and thus the matching probability of the second candidate record is lower at 0.42 (shown generally at 100). A predetermined number of the top ranked matching record candidates are listed or ranked by order (highest probability first), and the top ranked candidate having the highest probability is considered the matching preauthorization record to the received fax.

The logic used in the example of FIG. 9 is explained in more detail below:
1. Among all matching record candidates, because preauthorization ID is considered a unique identifier in the preauthorization database, if a record has a preauthorization ID equal to that extracted from the received fax, this candidate record is returned matching with a heuristically assigned probability of 1.
2. Else, if a record has a patient ID equal to that extracted from the fax, select the authorization records belonging to the same patients among the matching candidates, because patient ID is considered a unique identifier for a patient.
3. Else, the normalized edit distances are computed between the extracted keys and their corresponding matching fields in the authorization records.
4. The model returns a matching probability (e.g., using logistic regression) for all candidate matching records, and the top ranked by the probability is selected as most likely the record corresponding to the received fax.

While certain embodiments of the present invention are described in detail above, the scope of the invention is not to be considered limited by such disclosure, and modifications are possible without departing from the spirit of the invention as evidenced by the following claims:

What is claimed is:
1. A method for extracting data from a received fax from a medical provider and matching it with a corresponding preauthorization record, the method comprising the steps of:
   storing a plurality of preauthorization records in a database;
   extracting a plurality of keys from the received fax using a plurality of key extraction models, where the plurality of keys includes at least two of the following: an authorization ID, a patient ID, a patient name, a patient zip code or a patient date of birth;
   associating the received fax with a document identification;
   assigning a differential probability to each of the extracted keys; applying a
   deep learning model to the plurality of extracted keys and assigned differential probability of each of the extracted keys to match the received fax to a corresponding preauthorization record by:
      a. determining a list of potentially matching candidate preauthorization records by matching one or more of the extracted keys to matching data from the plurality of preauthorization records;
      b. determining a top matching candidate preauthorization record with the highest matching probability;
      c. linking the top matching candidate preauthorization record with the received fax by populating the top matching candidate preauthorization record with the document identification of the received fax.

2. The method according to claim 1, further comprising the steps of:
   applying a named entity recognition model to extract the patient name; and
   applying a pattern matching model to extract the authorization ID, patient ID, patient zip code or patient date of birth.

3. The method according to claim 1, further comprising the steps of:
   converting the received fax into text using Optical Character Recognition (OCR) before applying the plurality of key extraction models.

4. The method according to claim 1, further comprising the steps of:
   using a recipient fax number to apply business mapping rules to map the received fax to relevant information;
   identifying nonrelevant or nonmatching preauthorization records; reducing
   the preauthorization database to a subset of potentially matching candidate preauthorization records.

5. The method according to claim 4, further comprising the steps of:
   using the applied business mapping rules to determine whether the received fax relates to an inpatient or outpatient procedure; and
   excluding nonmatching preauthorization records based on the determination whether the received fax relates to an inpatient or outpatient procedure.

6. The method according to claim 1, further comprising the steps of:
   using a sender fax number to apply business mapping rules to map the received fax to a particular sending healthcare facility;
   identifying nonrelevant or nonmatching preauthorization records; reducing
   the preauthorization database to a subset of potentially matching candidate preauthorization records.

7. The method according to claim 1, further comprising the steps of:
   assigning a matching probability of one of the received authorization ID from the received fax matches a stored authorization ID found in one of the plurality of preauthorization records; and
   predicting there is a sufficient match without running the deeplearning model or models on the other extracted keys.

8. The method according to claim 1, further comprising the steps of:
   determining normalized distances between the plurality of extracted keys and their corresponding matching data fields from the plurality of preauthorization records; and
   using the normalized distances together with corresponding differential probabilities of the plurality of extracted keys as feature inputs to the deep learning model to match the received fax to the corresponding preauthorization record.

9. A method for extracting data from a received fax from a medical provider and matching it with a corresponding preauthorization record, the system comprising:
storing a plurality of preauthorization records in a database;
extracting a plurality of keys from the received fax using a plurality of key extraction models, where the plurality of keys includes at least two of the following:
an authorization ID, a patient ID, a patient name, a patient zip code or a patient date of birth;
associating the received fax with a document identification;
assigning a differential probability to each of the extracted keys; applying a
deep learning model to the plurality of extracted keys and assigned differential probability of each of the extracted keys to match the received fax to a corresponding preauthorization record by:
  a. determining a list of potentially matching candidate preauthorization records by matching one or more of the extracted keys to matching data from the plurality of preauthorization records;
  b. determining normalized distances between the plurality of extracted keys and their corresponding matching data fields from the plurality of preauthorization records;
  c. using the normalized distances together with corresponding differential probabilities of the plurality of extracted keys as feature inputs to the deep learning model to match the received fax to the corresponding preauthorization record;
  d. determining a top matching candidate preauthorization record with the highest matching probability;
  e. linking the top matching candidate preauthorization record with the received fax by populating the top matching candidate preauthorization record with the document identification of the received fax.

10. The method according to claim 9, further comprising the steps of:
applying a named entity recognition model to extract the patient name; and
applying a pattern matching model to extract the authorization ID, patient ID, patient zip code or patient date of birth.

11. The method according to claim 9, further comprising the steps of:
converting the received fax into text using Optical Character Recognition (OCR) before applying the plurality of key extraction models.

12. The method according to claim 9, further comprising the steps of:
using a recipient fax number to apply business mapping rules to map the received fax to relevant information;
identifying nonrelevant or nonmatching preauthorization records; reducing
the preauthorization database to a subset of potentially matching candidate preauthorization records.

13. The method according to claim 12, further comprising the steps of:
using the applied business mapping rules to determine whether the received fax relates to an inpatient or outpatient procedure; and
excluding nonmatching preauthorization records based on the determination whether the received fax relates to an inpatient or outpatient procedure.

14. The method according to claim 9, further comprising the steps of:
using a sender fax number to apply business mapping rules to map the received fax to a particular sending healthcare facility;
identifying nonrelevant or nonmatching preauthorization records;
reducing the preauthorization database to a subset of potentially matching candidate preauthorization records.

15. The method according to claim 9, further comprising the steps of:
assigning a matching probability of one of the received authorization ID from the received fax matches a stored authorization ID found in one of the plurality of preauthorization records; and
predicting there is a sufficient match without running the deeplearning model or models on the other extracted keys.

* * * * *